United States Patent
Amin-Sanayei et al.

(10) Patent No.: US 11,530,322 B2
(45) Date of Patent: Dec. 20, 2022

(54) FLUOROPOLYMER BLEND

(71) Applicant: Arkema Inc., King of Prussia, PA (US)

(72) Inventors: Ramin Amin-Sanayei, Malvern, PA (US); Gregory S. O'Brien, Downingtown, PA (US); Saeid Zerafati, Villanova, PA (US)

(73) Assignee: ARKEMA INC., King of Prussia, PA (US)

( * ) Notice: Subject to any disclaimer, the term of this patent is extended or adjusted under 35 U.S.C. 154(b) by 472 days.

(21) Appl. No.: 14/914,364

(22) PCT Filed: Aug. 28, 2014

(86) PCT No.: PCT/US2014/053073
§ 371 (c)(1),
(2) Date: Feb. 25, 2016

(87) PCT Pub. No.: WO2015/031569
PCT Pub. Date: Mar. 5, 2015

(65) Prior Publication Data
US 2016/0200907 A1  Jul. 14, 2016

Related U.S. Application Data

(60) Provisional application No. 61/872,081, filed on Aug. 30, 2013.

(51) Int. Cl.
*C08L 27/16* (2006.01)
*C08J 5/18* (2006.01)
(Continued)

(52) U.S. Cl.
CPC ............. *C08L 27/16* (2013.01); *B29C 48/04* (2019.02); *C08J 5/18* (2013.01); *B29K 2027/12* (2013.01);
(Continued)

(58) Field of Classification Search
CPC .. C08L 27/16; B29C 47/0011; B29K 2027/16
(Continued)

(56) References Cited

U.S. PATENT DOCUMENTS 3,857,827 A * 12/1974 Dohany .................... C08F 2/38
526/208
4,200,568 A    4/1980 Trautvetter et al.
(Continued)

FOREIGN PATENT DOCUMENTS

EP    0 168 020 A  *  1/1986
EP    1 357 151 A  * 10/2003
(Continued)

*Primary Examiner* — Vivian Chen
(74) *Attorney, Agent, or Firm* — Joanne Rossi (57) ABSTRACT

The present invention relates to the preparation of a thermoplastic fluoropolymer blend composition exhibiting improved mechanical properties upon fabrication. The fluoropolymer blend composite on is produced by blending an emulsion latex of fluoropolymer (A) with an emulsion latex of fluorinated copolymer (B). Copolymer (B) emulsion has a small particle size, super high MW, and a low degree of crystallinity. The blending of the latex emulsions results in a morphology with small particles of copolymer (B) uniformly distributed within a matrix of fluoropolymer (A) in a manner that could not be achieved by a mere melt blending of the tow components.

9 Claims, 7 Drawing Sheets

Morphology of PVDF A2+ 10% Resin B1

(51) Int. Cl.
*B29C 48/04* (2019.01)
*B29K 27/12* (2006.01)
*B29L 31/00* (2006.01)
*B29K 27/00* (2006.01)
*B29K 427/12* (2006.01)
*B29K 105/00* (2006.01)
*C08L 27/12* (2006.01)

(52) U.S. Cl.
CPC .. *B29K 2027/16* (2013.01); *B29K 2105/0088* (2013.01); *B29K 2427/12* (2013.01); *B29K 2427/16* (2013.01); *B29L 2031/00* (2013.01); *C08J 2327/16* (2013.01); *C08L 27/12* (2013.01); *C08L 2203/12* (2013.01); *C08L 2203/16* (2013.01); *C08L 2203/18* (2013.01); *C08L 2203/30* (2013.01); *C08L 2205/02* (2013.01); *C08L 2205/025* (2013.01); *C08L 2207/02* (2013.01); *Y10T 428/254* (2015.01); *Y10T 428/2982* (2015.01)

(58) Field of Classification Search
USPC ................................................ 428/421–422
See application file for complete search history.

(56) References Cited

U.S. PATENT DOCUMENTS

| | | | |
|---|---|---|---|
| 4,582,864 A * | 4/1986 | Abe | C08K 3/04 523/220 |
| 4,748,204 A * | 5/1988 | Kawashima | C08L 51/04 525/64 |
| 5,006,594 A * | 4/1991 | Rees | C08L 27/12 524/520 |
| 5,292,816 A * | 3/1994 | Metz | C08F 214/18 525/276 |
| 5,352,500 A | 10/1994 | Memon | |
| 5,429,849 A | 7/1995 | Lasson et al. | |
| 6,271,294 B1 | 8/2001 | Lasson et al. | |
| 6,310,141 B1 | 10/2001 | Chen et al. | |
| 6,362,271 B1 * | 3/2002 | Lin | C09D 127/16 523/346 |
| 6,376,586 B1 | 4/2002 | Pascal et al. | |
| 7,524,480 B2 | 4/2009 | Oka et al. | |
| 7,538,156 B2 | 5/2009 | Barriere et al. | |
| 2003/0002153 A1 * | 1/2003 | Hiraishi | G02B 6/0053 359/452 |
| 2004/0001928 A1 * | 1/2004 | Mekhilef | C08L 2666/04 428/36.9 |
| 2004/0167282 A1 * | 8/2004 | Pascal | C08L 27/16 525/109 |
| 2005/0075461 A1 * | 4/2005 | Morimoto | C08K 5/14 525/326.3 |
| 2006/0100333 A1 * | 5/2006 | Park | H01B 1/22 524/413 |
| 2006/0100368 A1 * | 5/2006 | Park | C08L 101/00 525/50 |
| 2007/0015874 A1 * | 1/2007 | Globus | C08L 2666/04 525/199 |
| 2007/0072985 A1 * | 3/2007 | Hintzer | B01J 41/05 524/544 |
| 2007/0135546 A1 * | 6/2007 | Amin-Sanayei | C08F 14/18 524/386 |
| 2008/0161481 A1 * | 7/2008 | Abusleme | C08L 27/16 524/544 |
| 2008/0182953 A1 * | 7/2008 | Wille | C08F 214/222 526/206 |
| 2009/0069488 A1 * | 3/2009 | Durali | C08L 27/16 524/527 |
| 2009/0124748 A1 * | 5/2009 | Baert | C08L 27/06 524/502 |
| 2009/0203846 A1 * | 8/2009 | Park | C08J 3/28 525/198 |
| 2010/0298487 A1 * | 11/2010 | Bonnet | C08K 5/0008 524/520 |
| 2012/0129982 A1 * | 5/2012 | Zipplies | C08L 27/20 524/58 |
| 2012/0142858 A1 * | 6/2012 | Amin-Sanayei | C08K 5/06 524/805 |
| 2014/0121321 A1 | 5/2014 | Kent et al. | |

FOREIGN PATENT DOCUMENTS

| | | | | |
|---|---|---|---|---|
| WO | WO2008005745 | | 1/2008 | |
| WO | WO-2011073254 A1 * | | 6/2011 | .............. C08F 14/22 |
| WO | WO 2012/084578 A * | | 6/2012 | |
| WO | WO-2012175414 A1 * | | 12/2012 | .............. C08F 14/22 |

* cited by examiner

FIG. 1

Effect of Resin B1 on Extensional Viscosity of PVDF A1

FIG. 2

Effect of Resin B1 on Extensional Viscosity of PVDF A2

FIG. 3

FIG. 4
PVDF A1 Plus Resin B1
Cold Izod Impact

FIG. 5
PVDF A2 Plus Resin B1
Cold Izod Impact

FIG. 6

Morphology of PVDF A2+ 10% Resin B1

Notched Izod Impact Testing vs Temperature
Fluoropolymer A4 -Copolymer B1 Latex Blends

FIG. 9
Comparative Example 17

FIG. 10
Comparative Examples vs Invention

FLUOROPOLYMER BLEND

This application claims benefit, under USE, § 119 far § 365 of PCT Application Number PCT/US2014/053073, filed Aug. 28, 2014, and U.S. Provisional Application No. 61/872,081, filed Aug. 30, 2013, these documents being incorporated herein by reference.

FIELD OF THE INVENTION

The present invention relates to the preparation of a thermoplastic fluoropolymer blend composition exhibiting improved mechanical properties upon fabrication. The fluoropolymer blend composite on is produced by blending an emulsion latex of fluoropolymer (A) with an emulsion latex of fluorinated copolymer (B). Copolymer (B) emulsion has a small particle size, super high MW, and a low degree of crystallinity. The blending of the latex emulsions results in a morphology with small particles of copolymer (B) uniformly distributed within a matrix of fluoropolymer (A) in a manner that could not be achieved by a mere melt blending of the two components. Due to the unique blend morphology, the fluoropolymer compositions of this invention have improved mechanical properties compared to melt blends. The fluoropolymer blend could find application in articles produced by melt processing, where improved mechanical properties are advantageous, such as in pipes, tubes, sheets, cable jacketing, rods, molded articles, melt-cast single or multi-layer films, and fibers.

BACKGROUND OF THE INVENTION

Melt-processable fluoropolymers are often formed into polymer articles and structures by a variety of different processes, such as extrusion, injection molding, fiber spinning, and extrusion blow molding, cast film and blown film. Fluoropolymers may also be used as polymer processing aids due to their low surface energies and phase behaviors.

Fluoropolymers, and especially polyvinylidene fluoride polymers and copolymers, are used in a variety of applications due to their excellent chemical resistance, weatherability, and long term thermal stability. Fluoropolymer articles are generally manufactured by thermoplastic processes. In many applications, improved impact resistance at room temperature and/or lower temperatures is desired, as this could extend the usefulness of the fabricated articles, or extend the useful temperature range for these applications. Typical fabricated articles include films, sheets, molded components, wire insulation and jacketing, etc. Other desired properties are a higher elongation at break and higher melt strength, which could be beneficial to the performance of films, fibers, and yarns made of these fluoropolymers.

Several methods have been proposed to improve impact properties of fluoropolymers by adding non-fluorinated impact modifiers to the fluoropolymer during manufacturing of final articles. U.S. Pat. No. 6,376,586 describes the use of an acrylic core-shell impact modifier in improving the impact properties of fluoropolymers. However, upon aging of the fabricated article at elevated temperature, i.e. above 140° C., the non-fluorinated impact modifier degrades and any improved properties will diminish. U.S. Pat. Nos. 5,429,849, 6,271,294 and US 2009/0124748 describe the addition of a second semicrystalline thermoplastic fluoropolymer to a fluoropolymer matrix to improve the mechanical properties, such as fatigue and impact resistance. These blends are melt compounded, rather than formed as a latex blend, and the disclosure specifically notes the presence of a single phase rather than a multi-phase. U.S. Pat. No. 4,200,568 describes the addition of fluoro-elastomers to a matrix to improve mechanical properties. There is no disclosure of the effects and advantages of super high molecular weight copolymer, nor a latex blending process.

Polyvinylidene fluoride (PVDF) resin exhibits a poor strength/elasticity ratio in the melt, especially at lower molecular weight, due to its linear chain architecture and relatively narrow molecular weight distribution (polydispersity ~2 to 3). Typically, increasing the molecular weight and introducing co-monomers with a different chemical composition can overcome this problem. However, these approaches are costly and often make the polymer more difficult to process. According to U.S. Pat. No. 7,514,480, the elasticity and the melt strength of PVDF can be increased by exposure to controlled amounts of radiation. However, this approach is not very practical and releases HF upon irradiation which is hazardous.

PVDF and its copolymers are also used as processing aids for polyolefin extrusion. U.S. Pat. No. 7,538,156 describes VDF/HFP copolymers of low molecular weight and fails to suggest any advantages of super high molecular weight copolymers.

Surprisingly it has been found that a fluoropolymer composition can be produced having improved mechanical properties after melt processing, by blending one or more latex of fluoropolymer (A) with one or more lattices of super high molecular weight fluorinated copolymers (B), followed by isolation and drying to obtain a multi-phase composition having fluoropolymer (A) as a continuous phase with discrete, evenly dispersed phases of super high MW copolymer (B) having low crystallinity and with a small domain size of 20-1000 nm. The mechanical properties of the blends of the invention are far better than similar blends formed by melt blending.

SUMMARY OF THE INVENTION

The invention relates to a fluoropolymer composite blend comprising:

a) 20 to 99 weight percent of a continuous fluoropolymer (A) phase; and b) 1 to 80 weight percent of uniformly dispersed discrete domains of fluorinated copolymer (B), wherein fluoropolymer (B) has a) a heat of fusion of 0 to 20 J/g or a modulus of less than 35,000 psi by ASTM D790, b) a high viscosity of greater than 25 kpoise by ASTM D3835 at 235° C. and $100^{-1}$ sec, c) a small domain size of 20-1000 nm.

The invention further relates to a process for forming the fluoropolymer composite blend by a) forming a fluoropolymer (A) latex;

b) forming a fluorinated copolymer (B) latex, wherein fluoropolymer (B) has a) a heat of fusion of 0 to 20 J/g or a modulus of less than 35,000 psi by ASTM D790, b) a high viscosity of greater than 25 kpoise by ASTM D3835 at 235° C. and $100^{-1}$ sec, c) blending fluoropolymer latex (A) and fluorinated copolymer (B) to form a stable latex containing as solids: 20-99 weight percent of fluoropolymer latex (A) and 1 to 80 weight percent of fluorinated copolymer (B);

d) isolating the polymer solids of the blend of c); to form a composite blend having a continuous phase of fluoropolymer (A) and small domains of copolymer (B) wherein said domains have a size of 20-1000 nm, and e) optionally pelletizing the isolated solids.

The invention further relates to articles formed from the fluoropolymer composite blend.

DETAILED DESCRIPTION OF THE INVENTION

The Invention relates to a latex blend of a fluoropolymer (A) with a latex of a fluorinated copolymer (B) having a low modulus, very high molecular weight, a small particle size and low crystallinity, the blend then being spray-dried to produce a fluoropolymer blend having a have a continuous fluoropolymer (A) matrix, and small domains of copolymer (B). As used herein, unless otherwise noted, percent refers to weight percent when describing compositions. The high molecular weight of the fluorocopolymer of the invention is described in terms of melt viscosity, as understood by one of ordinary skill in the art. In this particular case we are using a Dynisco capillary rheometer and measure the apparent viscosity at 235° C. and a shear rate of 100 sec-1.

The term "fluoropolymer", or "fluoropolymer (A)" as used herein, refers to polymers and copolymers (including polymers having two or more different monomers, including for example terpolymers) containing at least 50 mole percent of fluoromonomer units, preferably at least 80 mole percent, and in one embodiment all monomers are fluoromonomers. The term "(co)polymers" is used herein to denote polymers, copolymers, terpolymers, etc. Examples of fluoromonomers include, but are not limited to vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD). Preferred fluoropolymers, include homopolymers and copolymers of polyvinylidene fluoride (PVDF), ethylene tetrafluoroethylene (ETFE), terpolymers of ethylene with tetrafluoroethylene and hexafluoropropylene (EFEP), terpolymers of tetrafluoroethylene-hexafluoropropylene-vinyl fluoride (THV), copolymers of vinyl fluoride; and blends of PVDF with polymethyl methacrylate (PMMA) polymers and copolymers, or thermoplastic polyurethanes. A copolymer may contain other fluoromonomers, or up to 20 percent of other non-fluorinated ethylenically unsaturated monomers copolymerizable therewith. The preferred fluoromonomer is vinylidene fluoride.

Fluoropolymer A forms the continuous phase of the fluoropolymer blend of the invention.

The term "copolymer (B)", as used herein, refers to copolymers (including copolymers having two or more different monomers, including for example terpolymers) containing at least 50 mole percent of fluoromonomer units. Suitable exemplary fluoromonomers for use according to the invention include, but are not limited to, vinylidene fluoride, vinyl fluoride, trifluoroethylene, chlorotrifluoroethylene (CTFE), tetrafluoroethylene (TFE), hexafluoropropylene (HFP), and perfluorovinyl ethers such as PMVE and PPVE and their respected copolymers. A copolymer may contain other fluoromonomers, or up to 20 percent of other non-fluorinated ethylenically unsaturated monomers copolymerizable therewith. The preferred copolymers for this invention would contain at least the following two monomers: VDF and HFP, VDF and PMVE, VDF and CTFE, VDF and TFE. The resin of copolymer (B) latex contains low crystallinity, having a heat of fusion of less than 20 J/g, preferably <15 J/g to 0, and more preferably from <10 J/g to 0 and/or a low modulus, less than 35,000 psi by ASTM D790, preferably less than 20,000 PSI, and more preferably less than 10,000 PSI; has very high melt viscosity of greater than 25 kpoise, preferably greater than 30 kpoise, even greater than 35 kpoise, and even greater than 40 kpoise (Viscsoity is measured at 235° C. and 100 sec$^{-1}$ in capillary viscosity by ASTM D3835); and has small particle size, preferably less than 1000 nm, preferably from 20-500 nm, and more preferably from 50-300 nm. Copolymer B has a higher melt viscosity than fluoropolymer A. There is no limit to how high the melt viscosity can be, but preferably it is less than 75 kpoise, and more preferably less than 65 kpoise, and can even be less than 50 kpoise.

The process to form the blend of the invention involves producing fluoropolymer latex (A) and fluoro-copolymer latex (B) separately, blending the lattices, and then isolating the solid blend, by any means including for example spray-drying. The polymer blend can be used in thermoplastic processes to fabricate articles such as pipes, tubes, sheets, rods, cable jacketing, molded articles, melt-cast single or multi-layer films, fibers, yarns and as melt processing aid to produce other articles using different polymers.

The composition of the dried blend is such that fluoropolymer (A) is the continuous phase with a weight percent of 20 to 99% by weight, preferably 25 to 95% by weight, and more preferably 40 to 90% by weight, with copolymer B content from 1 to 80% by weight, preferably 5 to 75% by weight and more preferably 10 to 50% by weight.

Figure 1:
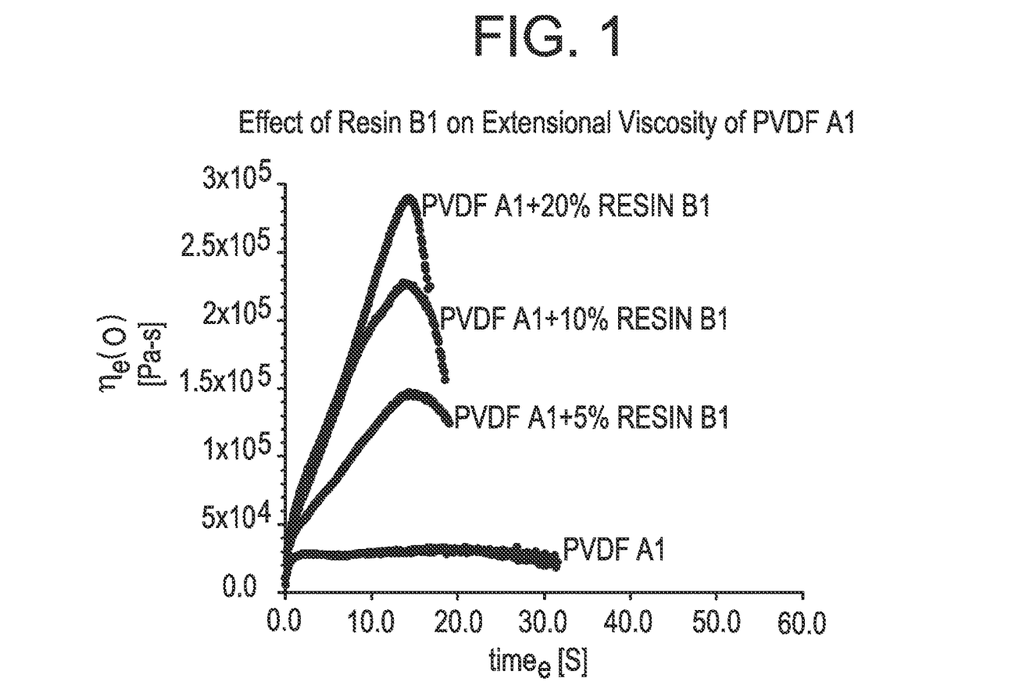
FIGS. 1 and 2 show the improvement on extensional viscosity with the fluoropolymer blend of the invention.
Figure 2:
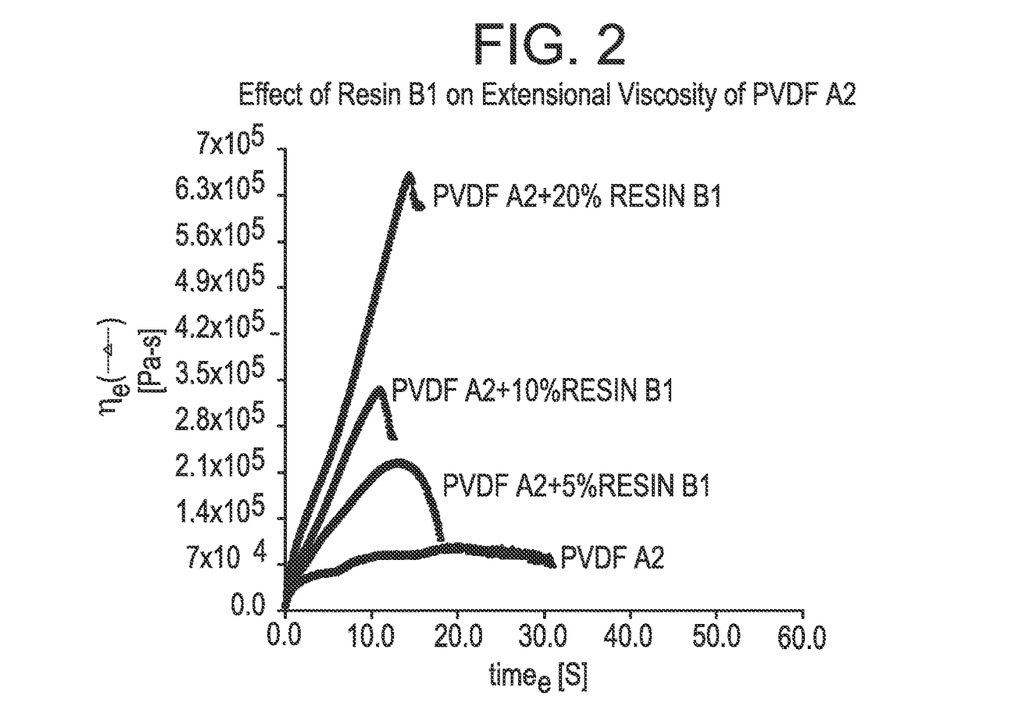

The blended resin above exhibits higher melt strength (FIGS. 1 & 2.) than then the unmodified Fluoropolymer (A1 or A2). This higher melt strength can aid in the formation of extrusion blown films, where high blow up ratios are present. High melt strength is also beneficial in fiber spinning and drawn film formation and in profile extrusion as used to form pipes, tubing, wire, cable and sheets. The high melt strength blend of the invention can exhibit an onset of shear thinning at lower shear rate than that observed in analogous linear polymers. This leads to lower head pressure, and torque, and reduces energy costs without sacrificing the bulk properties of the resin. In injection molding, the resin of the invention can exhibit much lower viscosity at high shear rates than an equivalent linear PVDF polymer, resulting in an improved surface finish and a higher throughput.

The following examples further illustrate the best mode contemplated by the inventor for the practice of their invention and are intended to be illustrative and not in limitation thereof. Polyvinylidene fluoride is a preferred embodiment, and will be used to illustrate the invention.

The term "vinylidene fluoride polymer" (PVDF) used herein includes both normally high molecular weight homopolymers, copolymers, and terpolymers within its meaning. Such copolymers include those containing at least 50 mole percent, preferably at least 75 mole %, more preferably at least 80 mole %, and even more preferably at least 85 mole % of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene, such as the copolymer composition disclosed in British Patent No. 827,308; and about 60 to 99 percent vinylidene fluoride and 1 to 40 percent hexafluoropropene (see for example U.S. Pat. No. 3,178,399); and about 70 to 99 mole percent vinylidene fluoride and 1 to 30 mole percent trifluoroethylene. Terpolymers of vinylidene fluoride, hexafluoropropene and tetrafluoroethylene such as the copolymer composition described in U.S. Pat. No. 2,968,649 and terpolymers of vinylidene fluoride, trifluoroethylene and tetrafluoroethylene are also representatives of the class of vinylidene fluoride copolymers, which can be prepared by the process embodied herein.

In one embodiment, up to 20%, and preferably up to 15%, by weight of hexafluoropropene (HFP) units and 80%, preferably 85%, by weight or more of VDF units are present in the vinylidene fluoride polymer. It is desired that the HFP units be distributed as homogeneously as possible to provide PVDF-HFP copolymer with excellent dimensional stability in an end-use environment.

The PVDF used in the invention is generally prepared by polymerizing means known in the art, using aqueous free-radical emulsion polymerization. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 110° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

EXAMPLES

Example 1

PVDF A1

Into an 80-gallon stainless steel reactor was charged, 400 lbs of deionized water, 250 grams of CAPSTONE FS-10, (partially fluorinated surfactant from Du Pont) and 0.2 lbs of potassium acetate. Following evacuation, agitation was begun at 23 rpm, the reactor was heated and 0.65 lbs of ethyl acetate was introduced. After reactor temperature reached the desired set point of 83° C., the VDF charge was started. Reactor pressure was then raised to 650 psi by charging approximately 35 lbs VDF into the reactor. After reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 70 pounds per hour. The VDF homopolymerization was continued until approximately 180 pounds VDF was introduced in the reaction mass. The VDF feed was stopped and the batch was allowed to react-out at the reaction temperature to consume residual monomer at decreasing pressure. After 25 minutes, the agitation was stopped and the reactor was cooled, vented and the latex recovered. Solids in the recovered latex were determined by gravimetric technique and were about 27 weight % and melt viscosity of about 12 kpoise according to ASTM method D-3835 measured at 450° F. and 100 sec$^{-1}$. The melting temperature of resin was measured in accordance with ASTM method D-3418 and was found to be about 167° C. The weight average particle size was measured by NICOMP laser light scattering instrument and was found to be about 250 nm.

Example 2

Copolymer B1

Into an 80-gallon stainless steel reactor was charged, 345 lbs of deionized water, 250 grams of CAPSTONE FS-10, (partially fluorinated surfactant from Du Pont) and 0.2 lbs of potassium acetate. Following evacuation, agitation was begun at 23 rpm, the reactor was heated. After reactor temperature reached the desired set point of 100° C., the VDF and HFP monomer were introduced to reactor with HFP ratio of 62 wt % of total monomers. Reactor pressure was then raised to 650 psi by charging approximately 35 lbs total monomers into the reactor. After reactor pressure was stabilized, 1.0 lbs of initiator solution made of 1.0 wt % potassium persulfate and 1.0 wt % sodium acetate were added to the reactor to initiate polymerization. Upon initiation, the ratio of HFP to VDF was so adjusted to arrive at 33% HFP to total monomers in the feed. The rate of further addition of the initiator solution was also adjusted to obtain and maintain a final combined VDF and HFP polymerization rate of roughly 100 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 38 kp according to ASTM method D-3835 measured at 450° F. and 100 sec$^{-1}$. The melting temperature of resin was measured in accordance with ASTMD3418 and was found to be not detectable during the second heat and there was no detectable heat of fusion. The weight average particle size was measured by NICOMP laser light scattering instrument and was found to be about 220 nm.

Example 3

Copolymer B2

Into an 80-gallon stainless steel reactor was charged, 345 lbs of deionized water, and 215 grams of SR-406 (from SATOMER). Following evacuation, agitation was begun at 23 rpm, the reactor was heated, and 1.2 lbs of ethyl acetate was added to the reactor. After reactor temperature reached the desired set point of 83° C., the VDF and HFP monomer were introduced to reactor with HFP ratio of 50 wt % of total monomers. Reactor pressure was then raised to 650 psi by charging approximately 35 lbs total monomers into the reactor. After reactor pressure was stabilized, 5.5 lbs of initiator solution made of 4.0 wt % potassium persulfate and 4.0 wt % sodium acetate were added to the reactor to initiate polymerization. Upon initiation, the ratio of HFP to VDF was so adjusted to arrive at 26% HFP to total monomers in the feed. The rate of further addition of the initiator solution was also adjusted to obtain and maintain a final combined VDF and HFP polymerization rate of roughly 90 pounds per hour. The VDF and HPF copolymerization was continued until approximately 240 pounds total monomers were introduced in the reaction mass. The HFP feed was stopped but VDF feed continued till approximately 260 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 40 weight % and melt viscosity of about 13.4 kp according to ASTM method D-3835 measured at 450° F. and 100 sec$^{-1}$. The melting temperature of resin was measured in accordance with ASTM method D-3418 and was found to be about 100° C. and heat of fusion measured to be 16 J/g. The weight average particle size was measured by NICOMP laser light scattering instrument and was found to be about 130 nm.

Example 4

PVDF A2

Into an 80-gallon stainless steel reactor was charged, 345 lbs of deionized water, 250 grams of CAPSTONE FS-10, (partially fluorinated surfactant from Du Pont) and 0.2 lbs of potassium acetate. Following evacuation, agitation was begun at 23 rpm, the reactor was heated, and 0.63 lbs of ethyl acetate was added to the reactor. After reactor temperature reached the desired set point of 83° C., the VDF and HFP monomer were introduced to reactor with HFP ratio of 14 wt % of total monomers. Reactor pressure was then raised to 650 psi by charging approximately 35 lbs total monomers into the reactor. After reactor pressure was stabilized, 3.5 lbs of initiator solution made of 1.0 wt % potassium persulfate and 1.0 wt % sodium acetate were added to the reactor to initiate polymerization. Upon initiation, the ratio of HFP to VDF was continued to arrive at 14% HFP to total monomers in the feed. The rate of further addition of the initiator solution was also adjusted to obtain and maintain a final combined VDF and HFP polymerization rate of roughly 90 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 13 kp according to ASTM method D-3835 measured at 450° F. and 100 sec$^{-1}$. The melting temperature of resin was measured in accordance with ASTM method D-3418 and was found to be about 135° C. The weight average particle size was measured by NICOMP laser light scattering instrument and was found to be about 220 nm.

Example 5

Synthesis of A3

Into an 80-gallon stainless steel reactor was charged, 400 lbs of deionized water, 250 grams of CAPSTONE FS-10, (partially fluorinated surfactant from Du Pont) and 0.2 lbs of potassium acetate. Following evacuation, agitation was begun at 23 rpm, the reactor was heated, and 1.4 lbs of ethyl acetate was added to the reactor. After reactor temperature reached the desired set point of 83° C., the VDF and HFP monomer were introduced to reactor with HFP ratio of 14 wt % of total monomers. Reactor pressure was then raised to 650 psi by charging approximately 35 lbs total monomers into the reactor. After reactor pressure was stabilized, 2.5 lbs of initiator solution made of 1.0 wt % potassium persulfate and 1.0 wt % sodium acetate were added to the reactor to initiate polymerization. Upon initiation, the ratio of HFP to VDF was continued to arrive at 14% HFP to total monomers in the feed. The rate of further addition of the initiator solution was also adjusted to obtain and maintain a final combined VDF and HFP polymerization rate of roughly 90 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 27.2 weight % and melt viscosity of about 17.3 kp according to ASTM method D-3835 measured at 450° F. and 100 sec$^{-1}$. The melting temperature of resin was measured in accordance with ASTM method D-3418 and was found to be about 140° C. The weight average particle size was measured by NICOMP laser light scattering instrument and was found to be about 220 nm.

Example 6

Synthesis of A4

Into an 80-gallon stainless steel reactor was charged, 345 lbs of deionized water and 66 grams of 13R1, (from BASF). Following evacuation, agitation was begun at 23 rpm, the reactor was heated, and 1.3 lbs of ethyl acetate was added to the reactor. After reactor temperature reached the desired set point of 100° C., the VDF and HFP monomer were introduced to reactor with HFP ratio of 45 wt % of total monomers. Reactor pressure was then raised to 650 psi by charging approximately 35 lbs total monomers into the reactor. After reactor pressure was stabilized, 4.5 lbs of initiator solution made of 1.0 wt % potassium persulfate and 1.0 wt % sodium acetate were added to the reactor to initiate polymerization. Upon initiation, the ratio of HFP to VDF was continued to arrive at 21% HFP to total monomers in the feed. The rate of further addition of the initiator solution was also adjusted to obtain and maintain a final combined VDF and HFP polymerization rate of roughly 90 pounds per hour. The VDF and HPF copolymerization was continued until approximately 190 pounds monomers were introduced in the reaction mass. The HFP feed was stopped but VDF feed continued till approximately 210 lbs of total monomers were fed to the reactor. The VDF feed was stopped and the batch was allowed to react-out at the reaction temperature to consume residual monomer at decreasing pressure. After 10 minutes, the initiator feed and agitation were stopped and the reactor was cooled, vented and the latex recovered. Solids in the recovered latex were determined by gravimetric technique and were about 35 weight % and melt viscosity of about 19.4 kp according to ASTM method D-3835 measured at 450° F. and 100 sec$^{-1}$. The melting temperature of resin was measured in accordance with ASTM method D-3418 and was found to be about 135° C. The weight average particle size was measured by NICOMP laser light scattering instrument and was found to be about 160 nm.

Examples 7, 8, 9

Figure 3:
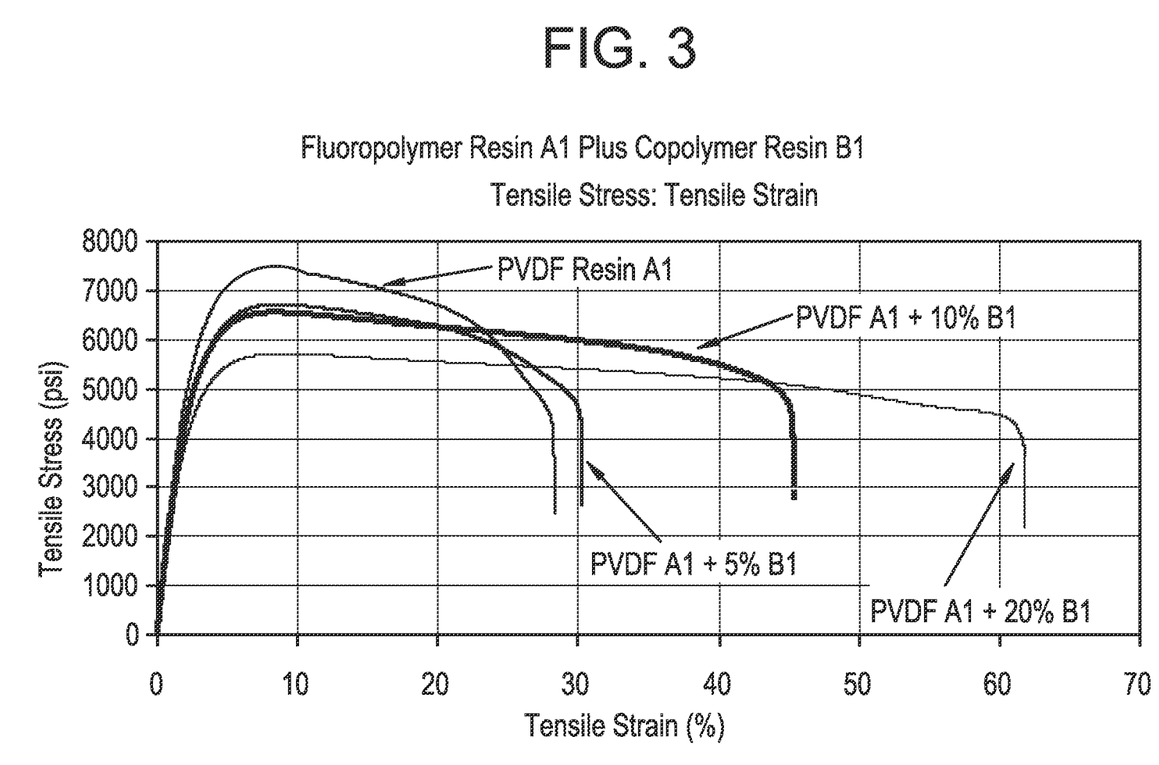
FIG. 3 shows the improvement in tensile strain with the fluoropolymer blend of the invention.
Figure 4:
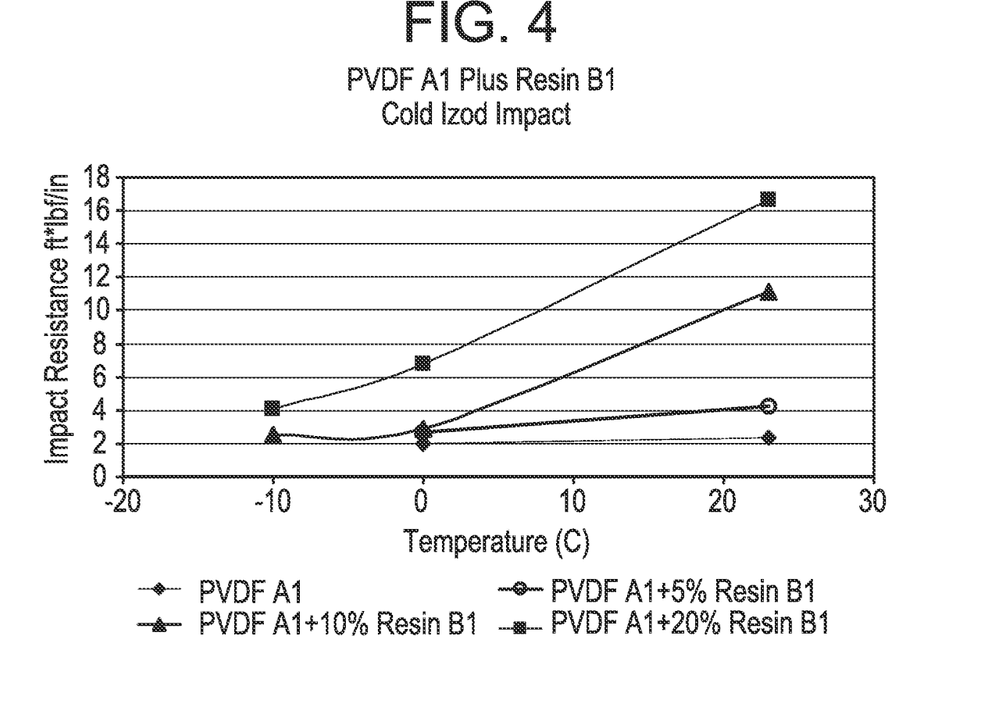
FIGS. 4, 5, 7 and 8 demonstrate the improvement in impact strength with the fluoropolymer blend of the invention.

The materials shown in Table 1 of this invention were produced by latex blending of Fluoropolymer resin A1 and Copolymer B1 from Examples 1 and 2. After thoroughly blending the two products in latex form, the blend was spray dried using a Niro spray drier to a moisture content of <0.3% moisture. The powders were then pelletized using a 30 mm co-rotating Weiner and Pfeiderer twin-screw extruder with a 220 C set point and screw rpm of 200. The pellets produced were injection molded using a Sumitomo 75 ton all electric injection molder with temperature set points of 210 C into ASTM D638 tensile bars and ASTM D790 flex bars and ASTM D256 izod test bars. Izod impact testing conducted under ASTM D256 protocols was conducted over a range of temperatures from 23 C to −10 C and the energy to break graphed in FIG. 4. In the graph the examples are labeled by the blend composition. It is clear that examples 7, 8 and 9 show improvements in either room temperature, and/or cold temperature energy to break. The improvement in elongational viscosity of this invention can be seen in the elongational viscosity of testing completed on these blends and graphed in FIG. 1. The improvement in elongation to break and total energy to break (area under the stress-strain curve) is demonstrated by the stress-strain curves of Examples 7, 8 and 9 (labeled by composition from Table 1) shown in FIG. 3.

Examples 10, 11, 12

Figure 5:
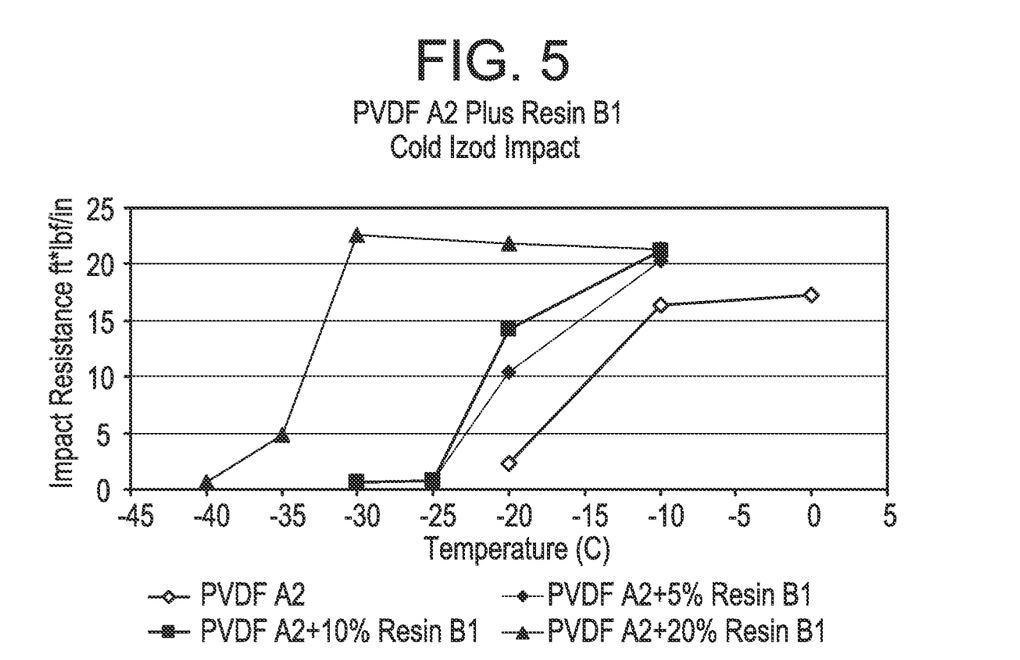

The materials shown in Table 1 of this invention were produced by latex blending of Fluoropolymer resin A2 and Copolymer B1 previously described. After thoroughly blending the two products in latex form, the blend was spray dried using a Niro spray drier to a moisture content of <0.3% moisture. The powders were then pelletized using a 30 mm co-rotating Weiner and Pfeiderer twin-screw extruder with a 220 C set point and screw rpm of 200. The pellets produced were injection molded using a Sumitomo 75 ton all electric molder with temperature set point at 210 C into ASTM D638 tensile bars and ASTM D790 flex bars and ASTM D256 izod test bars. Izod impact testing conducted under ASTM D256 protocols was conducted over a range of temperatures from 23 C to −40 C and the energy to break graphed in FIG. 5. In the graph the examples are labeled by the blend composition. It is clear that examples 10, 11 and 12 show improvements in either room temperature, and/or cold temperature energy to break. The improvement of elongational viscosity of this invention is shown by the results graphed in FIG. 2. A molded sample of Example 11 from Table 1 was cryomicrotomed Boeckleler Ultra cryo microtome, and then the copolymer phase was extracted with acetone at room temperature for 2 hours, the samples are dried overnight. The micotomed samples are then ion beam coated with gold-palladium coating. Then images are taken with a scanning electron beam microscope (Hitachi SU8010 Field Emission SEM) with a 2 Kilo-volt accelerating voltage and 10,000× magnification. The micrograph shows holes where the copolymer phase once was. The particle size of this dispersed phase is uniformly distributed and has an diameter in the range of 200 to 300 nm. This is very close to the original particle size noted in Example 2.

Examples 13 and 14

Figure 7:
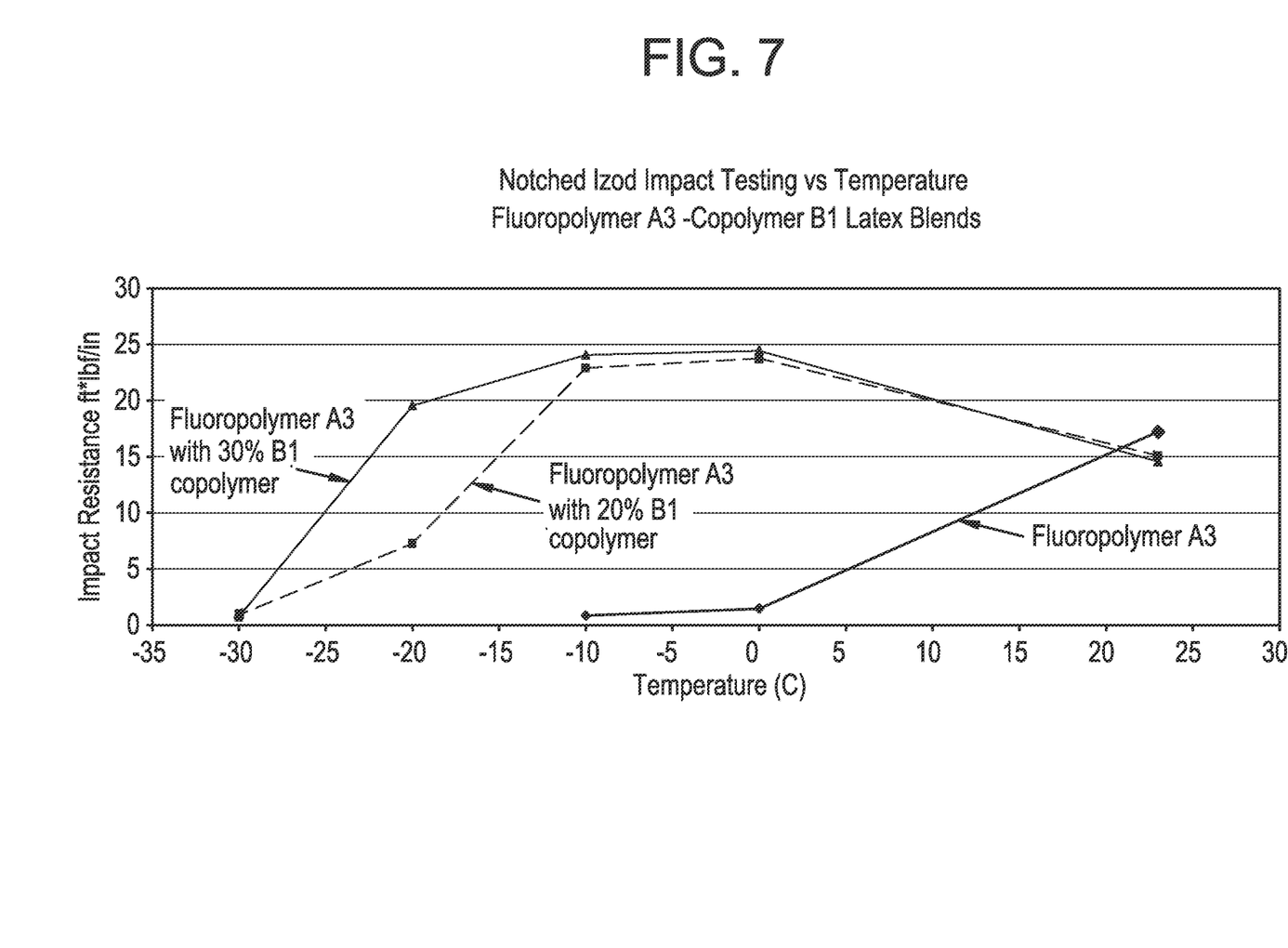

The materials shown in Table 1 of this invention were produced by latex blending of Fluoropolymer resin A3 and Copolymer B1 previously described. After thoroughly blending the two products in latex form, the blend was spray dried using a Niro spray drier to a moisture content of <0.3% moisture. The powders were then pelletized using a 30 mm co-rotating Weiner and Pfeiderer twin-screw extruder with a 220 C set point and screw rpm of 200. The pellets produced were injection molded using a Sumitomo 75 ton all electric molder with temperature set point at 210 C into ASTM D638 tensile bars and ASTM D790 flex bars and ASTM D256 izod test bars. Izod impact testing conducted under ASTM D256 protocols was conducted over a range of temperatures from 23 C to −30 C and the energy to break graphed in FIG. 7. In the graph the examples are labeled by the blend composition. It is clear that examples 13 and 14 show improvements in either room temperature, and/or cold temperature energy to break.

Examples 15 and 16

Figure 8:
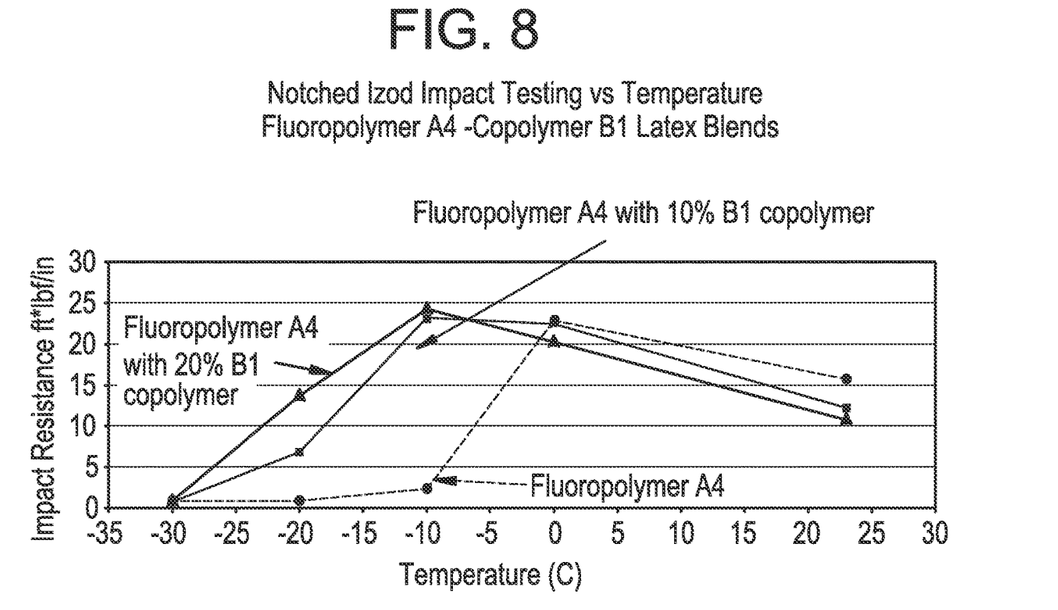

The materials shown in Table 1 of this invention were produced by latex blending of Fluoropolymer resin A4 and Copolymer B1 previously described. After thoroughly blending the two products in latex form, the blend was spray dried using a Niro spray drier to a moisture content of <0.3% moisture. The powders were then pelletized using a 30 mm co-rotating Weiner and Pfeiderer twin-screw extruder with a 220 C set point and screw rpm of 200. The pellets produced were injection molded using a Sumitomo 75 ton all electric molder with temperature set point at 210 C into ASTM D638 tensile bars and ASTM D790 flex bars and ASTM D256 izod test bars. Izod impact testing conducted under ASTM D256 protocols was conducted over a range of temperatures from 23 C to −30 C and the energy to break graphed in FIG. 8. In the graph the examples are labeled by the blend composition. It is clear that examples 15 and 16 show improvements in either room temperature, and/or cold temperature energy to break.

Comparative Example 17 and 18

Figure 6:
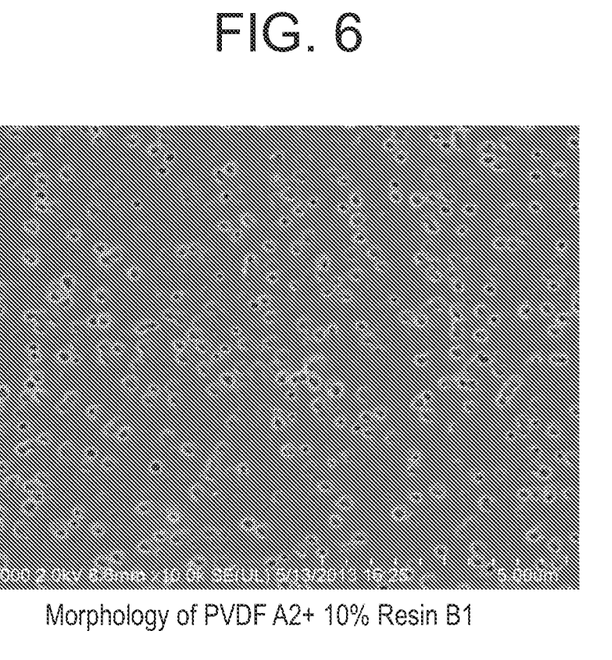
FIG. 6 is an SEM of the blend of the invention showing well dispersed, small phase size morphology.
Figure 9:
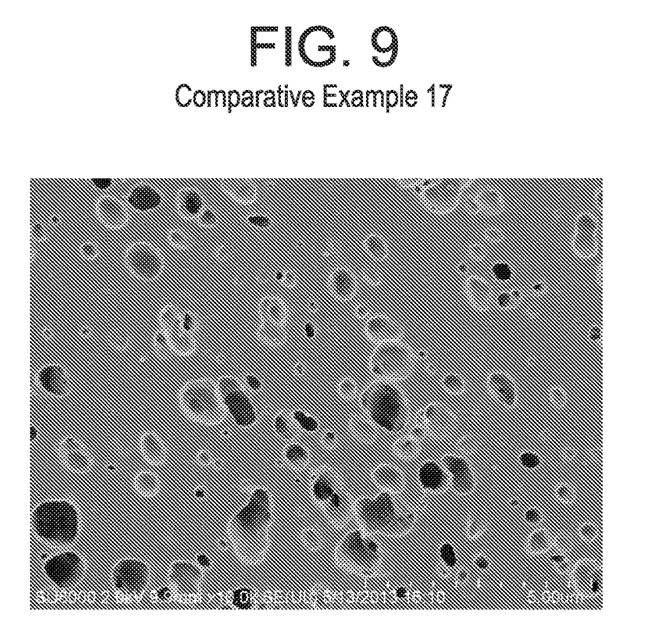
FIG. 9 is an SEM micrograph of comparative material showing that melt compounding results in much larger dispersed copolymer phase size.

Fluoropolymer A2 was twin screw compounded with isolated pellets of Copolymer B2 on a 30 mm co-rotating Weiner and Pfeilderer twin-screw extruder with a set temperature of 220 C and screw speed of 200 rpm. The pellets produced were injection molded using a Sumitomo 75 ton all electric molder with temperature set point at 210 C into ASTM D638 tensile bars and ASTM D790 flex bars and ASTM D256 izod test bars. A molded sample of Example 17 from Table 1 was cryo-microtomed Boeckleler Ultra cryo microtome, and then the copolymer phase was extracted with acetone at room temperature for 2 hours, the samples are dried overnight. The micotomed samples are then ion beam coated with gold-palladium coating. Then images are taken with a scanning electron beam microscope (Hitachi SU8010 Field Emission SEM) with a 2 Kilo-volt accelerating voltage and 10,000× magnification. The SEM micrograph in FIG. 9 can be compared with the same formulation shown in FIG. 6 shows that melt compounding results in much larger dispersed copolymer phase size.

Figure 10:
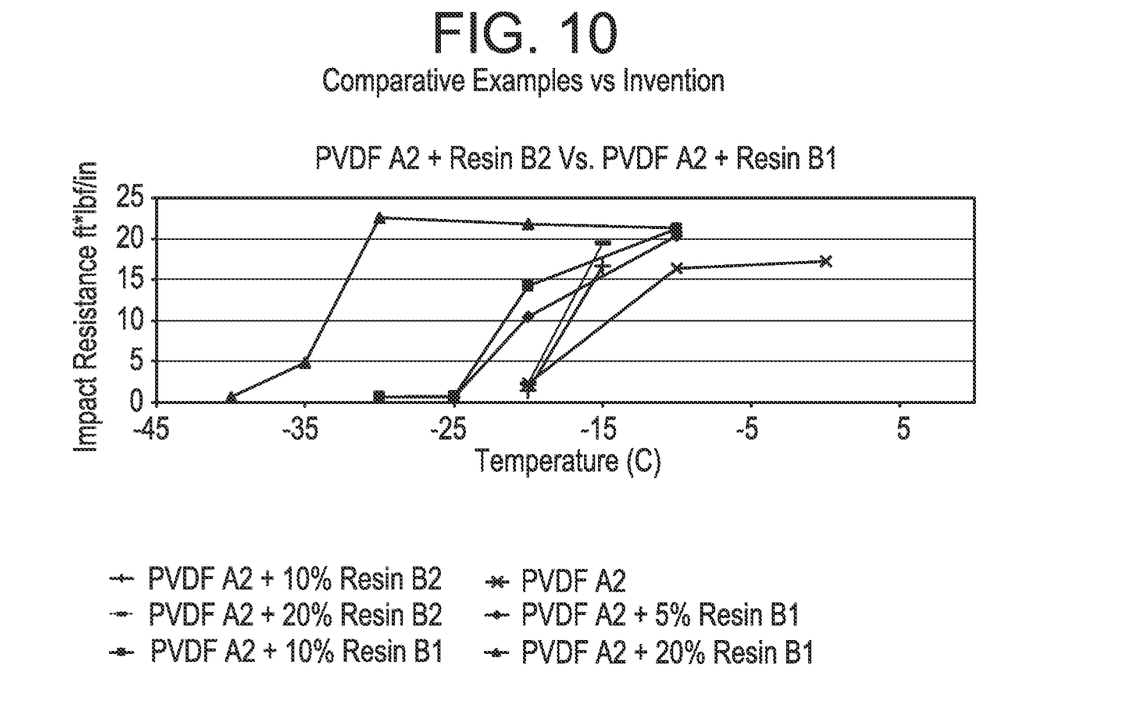
FIG. 10 is a graph showing Izod impact resistance for examples of the invention vs. comparative examples.

Izod impact testing conducted under ASTM D256 protocols was conducted over a range of temperatures from 23 C to −30 C and the energy to break graphed in FIG. 10. This comparison shows that the invention results in a significant improvement in impact performance when compared with melt compounding of the two polymers.

Table 1 below shows the descriptions of the blends.

TABLE 1

| Sample # | Wt % resin B2 | Wt % resin B1 | Wt % PVDF A | PVDF A Material |
| --- | --- | --- | --- | --- |
| 01 | | 0 | 100 | Resin A1 |
| Ex 7 | | 5 | 95 | Resin A1 |
| Ex 8 | | 10 | 90 | Resin A1 |
| Ex 9 | | 20 | 80 | Resin A1 |
| 02 | | 0 | 100 | Resin A2 |
| Ex 10 | | 5 | 95 | Resin A2 |
| Ex 11 | | 10 | 90 | Resin A2 |
| Ex 12 | | 20 | 80 | Resin A2 |
| 03 | | 0 | 100 | Resin A3 |
| Ex 13 | | 20 | 80 | Resin A3 |
| Ex 14 | | 30 | 70 | Resin A3 |
| 04 | | 0 | 100 | Resin A4 |
| Ex 15 | | 10 | 90 | Resin A4 |
| Ex 16 | | 20 | 80 | Resin A4 |
| Comp Ex 17 | 10 | | 90 | Resin A2 |
| Comp Ex 18 | 20 | | 80 | Resin A2 |

What is claimed is:

1. A fluoropolymer composite blend comprising:
   a) 20 to 99 weight percent of a continuous fluoropolymer (A) phase; and
   b) 1 to 80 weight percent of uniformly dispersed discrete domains of fluorinated copolymer (B), wherein copolymer (B) has a) a heat of fusion of 0 to 20 J/g or a modulus of less than 35,000 psi by ASTM D790, b) a high viscosity of greater than 25 kpoise by ASTM D3835 at 235° C. and $100^{-1}$ sec, and c) a small domain size of 20-1000 nm and wherein surfactants used in the polymerization of copolymer (B) consists of non-fluorinated surfactants, wherein the polymer in the dispersed discrete domains of copolymer (B) consists of vinylidene fluoride copolymers.

2. The fluoropolymer composite blend of claim 1, wherein fluoropolymer (A) and copolymer (B) each comprise at least 70 mole percent of vinylidene fluoride (VDF) monomer units.

3. The fluoropolymer composite blend of claim 2, wherein copolymer (B) is a copolymer comprising 70 mole percent or more of VDF and 1 to 30 mole percent of one or more monomers selected from chlorotrifluoroethylene (CTFE), tetrafluoroethylene (TFE), hexafluoropropylene (HFP), perfluoro propyl vinyl ether (PPVE) and perfluoro methyl vinyl ether (PMVE).

4. The fluoropolymer composite blend of claim 1, wherein copolymer (B) has a) a heat of fusion of 0 to 15 J/g or a modulus of less than 20,000 psi by ASTM D790, b) a high viscosity of 30 to 60 kpoise by ASTM D3835 at 235° C. and $100^{-1}$ sec, c) a small domain size of 20-500 nm.

5. The fluoropolymer composite blend of claim 4, wherein copolymer (B) has a) a heat of fusion of 0 to 10 J/g or a modulus of less than 10,000 psi by ASTM D790, b) a high viscosity of 35 to 55 kpoise by ASTM D3835 at 235° C. and $100^{-1}$ sec, c) a small domain size of 50-300 nm.

6. The fluoropolymer composite blend of claim 1, wherein fluoropolymer (A) comprises 25-95 weight percent and copolymer (B) comprises 5-75 weight percent of the blend.

7. The fluoropolymer composite blend of claim 1, wherein fluoropolymer (A) comprises 40-90 weight percent and copolymer (B) comprises 10-60 weight percent of the blend.

8. An article comprising the fluoropolymer composite blend of claim 1.

9. The article of claim 8, wherein said article is selected from the group consisting of: pipes, tubes, sheets, cable jacketing, rods, molded articles, melt-cast single or multilayer films, and fibers.

* * * * *